April 14, 1959 A. V. LORD 2,882,444

ELECTRONIC INFORMATION STORAGE

Filed Dec. 10, 1956 2 Sheets-Sheet 1

INVENTOR
Arthur V. Lord
BY
Ralph B. Stewart
ATTORNEY

April 14, 1959 A. V. LORD 2,882,444

ELECTRONIC INFORMATION STORAGE

Filed Dec. 10, 1956 2 Sheets-Sheet 2

INVENTOR
Arthur V. Lord
BY
Ralph B. Stewart
ATTORNEY 2,882,444

ELECTRONIC INFORMATION STORAGE

Arthur Valentine Lord, Banstead, England, assignor to Marconi's Wireless Telegraph Company Limited and Standard Telephones & Cables Limited, both of London, England

Application December 10, 1956, Serial No. 627,384

Claims priority, application Great Britain January 12, 1956

6 Claims. (Cl. 315—11)

The present invention relates to the storage of information electronically and the reading of such information.

The principal object of the present invention is to provide an improved method and means for the storage of electrical signals, such for example as television signals, for a limited period and for the reading of the stored signals at a rate which may be the same as, or different from, the rate at which the signals were stored. An example of the use of such a method is the delaying of television signals by a frame or line period, but the invention is applicable for many other purposes.

According to the invention a method of storing electrical information and reading the stored information comprises the steps of scanning a photo-sensitive surface with a light spot modulated in accordance with the information to be stored thereby releasing electrons from the surface, directing the electrons upon an electric charge-retaining storage screen in such a manner as to produce on the screen a charge pattern representative of the information, scanning the photo-sensitive surface with a light spot unmodulated by the information and directing the electrons thereby released upon the screen to generate in a signal plate coupled to the storage surface of the screen signals representative of the stored information, lowering the potential of an electrode positioned to collect secondary electrons from the screen, and, while the said electrode is at the lowered potential, illuminating the photo-sensitive surface in such a manner as to establish on the screen a substantially uniform potential approximately equal to the said lowered potential.

The invention also provides apparatus whereby the method set forth may be conveniently performed.

Figure 1:
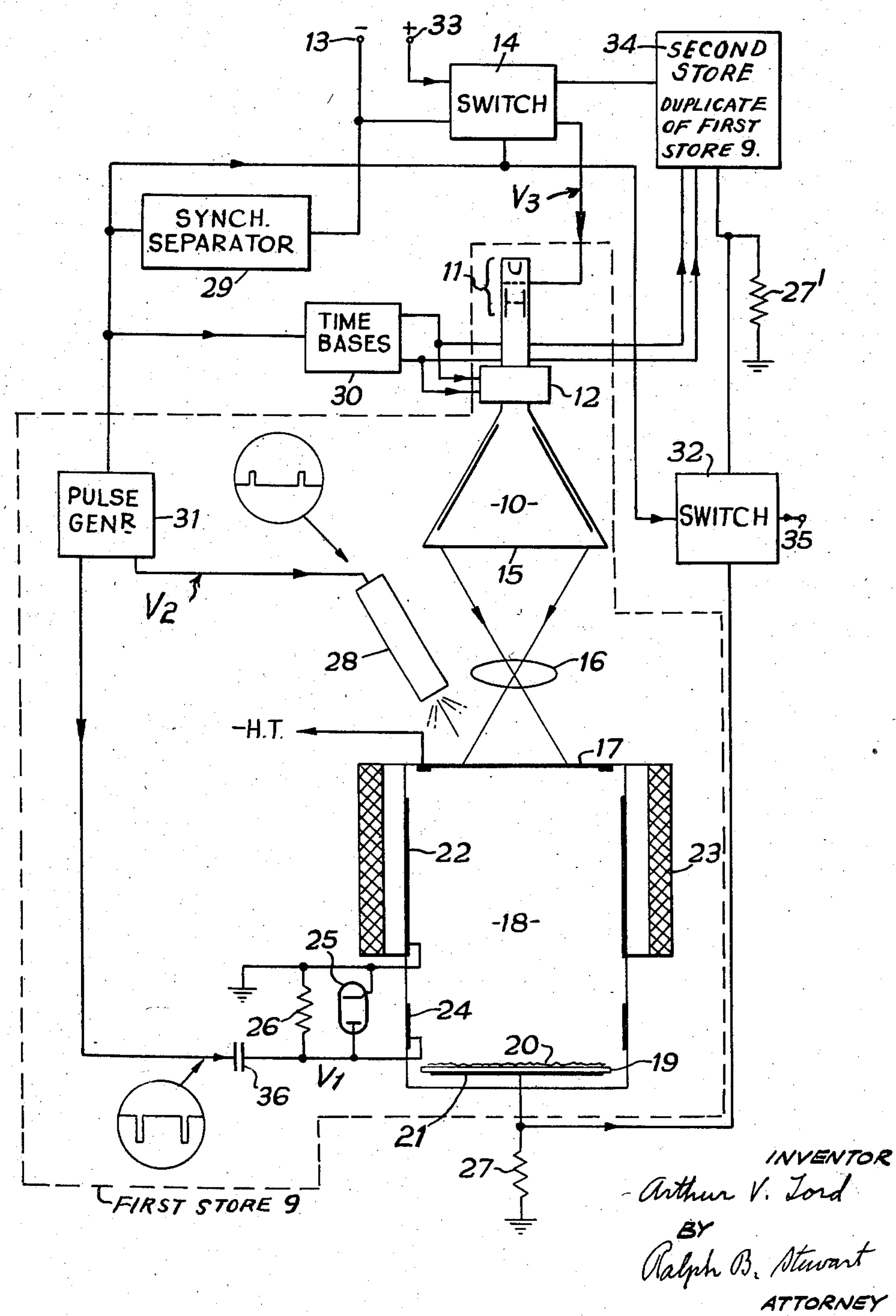
Fig. 1 shows an apparatus in diagrammatic form for carrying out the objects of the invention.
Figure 2:
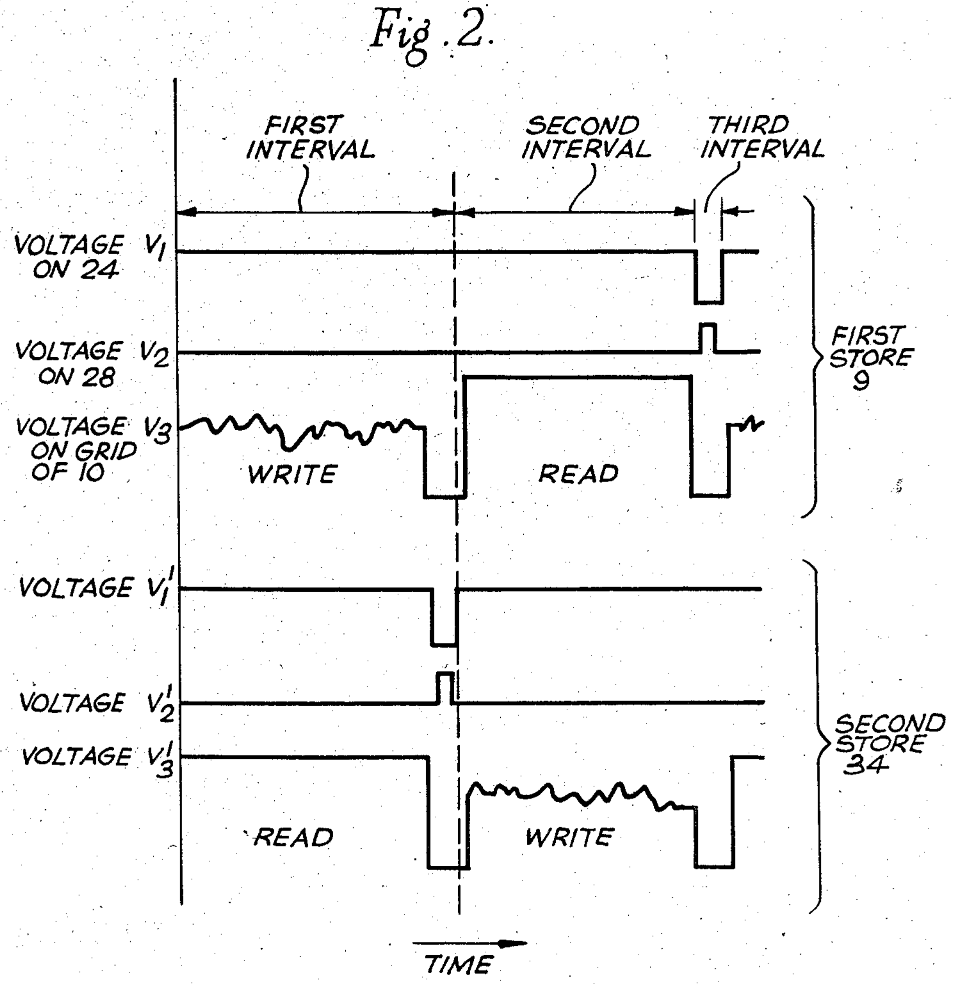
Fig. 2 is a set of waveform diagrams showing the voltage pulses in timed relation for controlling the operation of the apparatus of Fig. 1.

The invention will be described, by way of example, with reference to the accompanying drawing which shows diagrammatically one form of apparatus in accordance with the invention.

The apparatus shown comprises a cathode ray tube 10, which may be of the kind used in television reproduction having a short persistence screen. The tube 10 has the usual electron gun and accelerating electrodes 11 and beam-deflecting means 12. For the purpose of this description it will be assumed that it is required to store the signals of one television frame and to reproduce the stored signals with a delay of one frame period. The signals are applied at a terminal 13 through a switch 14 (assumed closed) to control the intensity of the cathode ray beam, and the beam is caused to scan a raster on the screen 15 and thus to produce a picture on the screen as in television reproduction.

The light from the screen 15 is focused by a lens 16 upon a photo-cathode 17 of a tube 18 which may be of the same construction as an image iconoscope without an electron gun. Thus the tube 18 has a mica sheet 19 carrying on one side a mosiac screen 20 of conducting elements and on the other side a signal plate 21. Electrons liberated from the photo-cathode 17 are accelerated towards the mosaic 20 by the electrostatic field produced by a high negative potential on the photo-cathode 17 and an annular earthed wall anode 22. The electrons are focused upon the mosaic by a focusing coil 23. Secondary electrons generated at the mosaic 20 are collected by an annular electrode 24 connected to earth through a diode 25 in parallel with a resistor 26. Output signals are obtained across a resistor 27. A "flash" tube 28 is provided whereby the whole surface of the photo-cathode 17 can be flooded with light.

Synchronising signals at terminal 13 are separated by a synchronising separator 29 and are applied to control time bases 30 which supply line and frame deflecting currents to the deflecting means 12. Frame synchronising signals are also applied from the separator 29 to a pulse generator 31, and to switches 14 and 32 which are thereby thrown over from one setting to the other once every frame. The switch 14 in one setting applies signals from 13 to the control grid of the tube 10 and in the other setting applies a steady positive bias from a terminal 33 to the control grid.

A second store 34 including components corresponding to 10 to 12 and 15 to 26 inclusive constituting the first store is provided and is switched into and out of operation by the switch 14 alternately with the first store: thus when signals from 13 are applied to the grid of tube 10, the positive voltage from 33 is applied to the grid of the tube in 34 and vice versa. A resistor 27′ corresponding to the resistor 27 is provided for the second store 34 and the switch 32 serves to connect these resistors alternately to an output terminal 35, the resistor 27 being connected to the output when the positive voltage from 33 is applied to the grid of the tube 10.

Considering first the operation of the first store, it will be assumed that, initially, the mosaic 20 is at a uniform potential equal to or near that of the wall anode 22 and that no light is falling on the photo-cathode 17. A negative-going pulse of several volts is now applied from the generator 31 through a capacitor 36 to the collector electrode 24 and while this pulse is effective a narrower pulse is applied from the generator 31 to the flash tube 28. The latter pulse is arranged to begin after and to end before the pulse applied to the electrode 24.

The flooding of the photo-cathode 17 with light results in the liberation of a stream of electrons which is directed upon the mosaic 20. The primary electrons together with the secondary electrons liberated from the mosaic thereby will be retained by the mosaic until the potential of the mosaic has fallen to, or near, that of the collector electrode 24 and thereafter, the secondary electrons are collected by the electrode 24 so that the mosaic is stabilised at a potential approximately equal to that of the electrode 24. When the pulse applied to the electrode 24 ends the mosaic is left at a potential substantially below that of the electrode 24.

The signals to be stored are now applied through the switch 14 to the grid of the tube 10 and the beam in the tube 10 is caused to scan a raster. The light from the screen 15 directed by the lens 16 on to the photo-cathode 17 liberates electrons which are focused upon the mosaic 20. The intensity of the electron beam falling on the mosaic 20 will vary from point to point directly as the brightness of the screen 15 and the velocity of the electrons is sufficient to liberate a number of secondary electrons greater than the number of primary electrons. These secondary electrons are collected by the more positive collector electrode 24 and there will therefore bet set up on the mosaic 20 a pattern of positive charges corresponding to the signals applied to the control grid of the tube 10. The "write" portion of the cycle of operations in the first store is thus completed.

During the next frame the "write" cycle described takes place in the second store 34 while reading takes place from the first store. For this purpose the beam intensity in the tube 10 is maintained at a constant high value by the positive voltage applied to the grid from 33 and the beam is scanned over the screen 15 along the same path as before. The resulting beam of electrons, of constant intensity, in the tube 18 will liberate secondary electrons to the electrode 24 until each area bombarded reaches a potential at or near that of the electrode 24 and in so doing will generate in the signal plate 21 currents dependent upon the charges stored on the individual areas of the mosaic. These currents flowing through the resistor 27 will generate the required output voltage.

When this reading operation has been completed the surface of the mosaic 20 will be at an approximately uniform potential near that of the wall anode 22. The switch 32 connects the output 35 to that one of the resistors 27 and 27' across which at any time read signals are generated.

The application of the negative pulse to the collector electrode 24 and the flashing of the tube 28 serve not only to stabilise the mosaic at the required potential (below that of the collector electrode after the pulse has ceased) but also to remove any residual charge pattern on the mosaic 20.

I claim:

1. A method of storing electrical information and reading the stored information comprising the steps of scanning a photo-sensitive surface with a light spot modulated in accordance with the information to be stored thereby releasing electrons from the surface, directing the electrons upon an electric charge-retaining storage screen to produce on said screen a charge pattern representative of the information, scanning the photo-sensitive surface with a light spot unmodulated by the information and directing the electrons thereby released upon the screen to generate in a signal plate coupled to the storage surface of the screen signals representative of the stored information, lowering the potential of an electrode positioned to collect secondary electrons from the screen, and, while the said electrode is at the lowered potential, illuminating the photo-sensitive surface in such a manner as to establish on the screen a substantially uniform potential approximately equal to the said lowered potential.

2. Apparatus for storing electrical information comprising a photo-sensitive surface, means for scanning a path on said surface with a light spot during a first and a second time interval, means operative during said first time interval to modulate the intensity of said light spot in dependence upon said information, thereby releasing photo-electrons from said surface, an electric charge-retaining storage screen, means for focusing said photo-electrons upon said screen, to store information on said screen in the form of a charge pattern, a signal plate coupled to said screen and having voltages generated therein during said second interval corresponding to said stored information, an electrode positioned to collect secondary electrons from said screen, means operative during a third time interval following said second interval to lower the potential of said electrode, and means operative during said third interval to illuminate said photo-sensitive surface.

3. Apparatus according to claim 2, wherein said scanning means comprises a cathode ray tube.

4. Apparatus according to claim 2, wherein said potential lowering means and said illuminating means comprise pulse generating means.

5. Apparatus according to claim 4, comprising a light source positioned to illuminate said photo-sensitive surface and means coupling said pulse generating means to said light source; whereby a pulse from said generating means renders said light source operative during said third interval.

6. Apparatus according to claim 5, wherein said pulse begins after and ends before said third interval.

References Cited in the file of this patent

UNITED STATES PATENTS

| | | |
|---|---|---|
| 2,634,327 | Sziklai | Apr. 7, 1953 |
| 2,755,408 | Theile | July 17, 1956 |